United States Patent [19]

Burgess

[11] Patent Number: 5,280,924
[45] Date of Patent: Jan. 25, 1994

[54] AUTOMATIC SEAL DEPRESSURIZATION SYSTEM

[75] Inventor: Raymond W. Burgess, Bradford, Pa.

[73] Assignee: Dresser-Rand Company, Corning, N.Y.

[21] Appl. No.: 843,020

[22] Filed: Feb. 28, 1992

[51] Int. Cl.⁵ .............................................. F16J 15/10
[52] U.S. Cl. ................................... 277/3; 277/15; 277/29; 277/59; 277/71; 220/205; 220/367
[58] Field of Search ............... 277/1, 29, 3, 70, 71, 277/15, 16, 59, 68, 71, 167.3; 220/205, 227, 366, 367; 92/86

[56] References Cited

U.S. PATENT DOCUMENTS

| | | | |
|---|---|---|---|
| 2,394,364 | 2/1946 | Christensen | 277/59 |
| 2,774,619 | 12/1956 | Mercier | 277/70 |
| 3,144,035 | 8/1964 | Hablanian et al. | 277/3 |
| 3,181,873 | 5/1965 | Reed | 277/3 |
| 3,293,994 | 12/1966 | Napolitano | 92/86 |
| 3,328,039 | 6/1967 | McKeough | 277/3 |
| 3,582,088 | 6/1971 | Matsuzaki et al. | 277/3 |
| 4,430,048 | 2/1984 | Fritsch | 92/86 X |
| 5,028,205 | 7/1991 | Kapadia et al. | 277/24 X |
| 5,031,509 | 7/1991 | Cowan | 277/24 X |

FOREIGN PATENT DOCUMENTS 1113269  5/1968  United Kingdom ................ 277/1

*Primary Examiner*—William A. Cuchlinski, Jr.
*Assistant Examiner*—James K. Folker
*Attorney, Agent, or Firm*—Jones, Day, Reavis & Pogue

[57] ABSTRACT

A method and apparatus for protecting spaced high pressure seals in a high pressure chamber from damage caused by retained high pressure between the seals after the high pressure in the chamber has been released. A one-way check valve is coupled to the area between the seals and to the interior of the high pressure chamber to automatically vent the area between the seals only when the high pressure in the chamber has been released or removed.

26 Claims, 2 Drawing Sheets

AUTOMATIC SEAL DEPRESSURIZATION SYSTEM

FIELD OF THE INVENTION

The present invention relates in general to high pressure fluid seals and in particular to a high pressure fluid seal having at least two spaced seals and in which the space between the seals can be automatically depressurized when the pressure in a device such as an air compressor is released.

BACKGROUND OF THE INVENTION

High pressure devices such as compressors have component parts which are fitted together. Because of the high pressure that the unit contains, the parts that are fitted together generally have seals therebetween. In high pressure systems such as compressors, the pressure can gradually seep past a seal over extended periods of time. Thus, generally, two seals are placed in spaced relationship to each other to form an area in which the fluid that bypasses the first seal can collect. The second seal forms an effective barrier against further loss of pressure.

When the unit such as the compressor is shut down or stopped, it is depressurized inside. However, the pressure that is caught between the two seals remains and provides a constant prolonged pressure against the two seals creating undue wear and premature failure of the seals such as O-rings.

The present invention overcomes the disadvantages of the prior art by providing a system and method for automatically depressurizing the area between the two O-ring seals after the compressor unit has been stopped or shut down. In particular, a passageway connects the space between the two seals and formed by the adjoining surfaces to the interior of the unit such as a compressor. A one-way check valve is located in the passageway so as to allow pressure to enter the interior of the unit such as the compressor from the space between the seals but not to allow pressure to leave the compressor into the passageway during operation of the compressor. When the compressor is in operation, the passageway is held closed by a spring loaded sealing head in the check valve. Pressure in the compressor assists in holding the check valve in the closed position. Internal pressure in the unit seeps through the inner O-ring seal, through permeation, to a cavity between the inner and outer O-ring seals formed by the two surfaces joined together to form the chamber.

When the compressor is stopped or shut down and the inside of the casing is depressurized, the high pressure gas or fluid is trapped between the inner and outer O-ring seals. The trapped pressure follows the passageway connecting the space between the inner and outer O-ring seals toward the interior of the compressor. A check valve is placed in the passageway which will open to the internal side of the compressor allowing the high pressure trapped between the O-rings to automatically vent down when the compressor is depressurized internally, thus protecting and prolonging the use of the O-ring seals.

Thus, it is an object of the present invention to provide a device and method for depressurizing the area between two spaced high pressure seals such that any high pressure that seeps into the cavity between the seals during operation of the compressor or other device will not be maintained in the space to cause deterioration of the seals when the device is shut down.

It is another object of the present invention to couple a one-way check valve from the space between the seals to the interior of the compressor such that when the compressor is depressurized any high pressure remaining between the seals is automatically vented back into the interior of the compressor unit.

SUMMARY OF THE INVENTION

Thus, the present invention relates to a system for automatically depressurizing the cavity between adjacent high pressure seals in a high pressure unit comprising a high pressure fluid chamber having at least two surfaces joined together to form the chamber, first and second spaced seals in the cavity between the surfaces to form a barrier to prevent the high pressure fluid from leaking from the chamber through the cavity between the joined surfaces, and a one-way check valve coupling the cavity between the joined surfaces intermediate of the seals to the interior of the high pressure chamber to prevent high pressure fluid from entering the check valve during the existence of the high pressure in the chamber while allowing any high pressure fluid trapped in the cavity between the seals to automatically vent to the interior of the hollow chamber only when the hollow chamber is depressurized so as to relieve the stress on the seals.

The invention also relates to a method of protecting spaced high pressure seals in a high pressure chamber from damage caused by retained high pressure in a cavity between the seals after the high pressure in the chamber has been removed comprising the step of coupling a one-way check valve to the cavity between the seals and to the interior of the high pressure chamber to automatically vent the cavity between the seals only when the high pressure in the chamber has been removed.

BRIEF DESCRIPTION OF THE DRAWING

These and other objects of the present invention will be more fully understood in conjunction with the accompanying drawings in which like numbers indicate like components and in which.

DETAILED DESCRIPTION OF THE DRAWINGS

Figure 1:
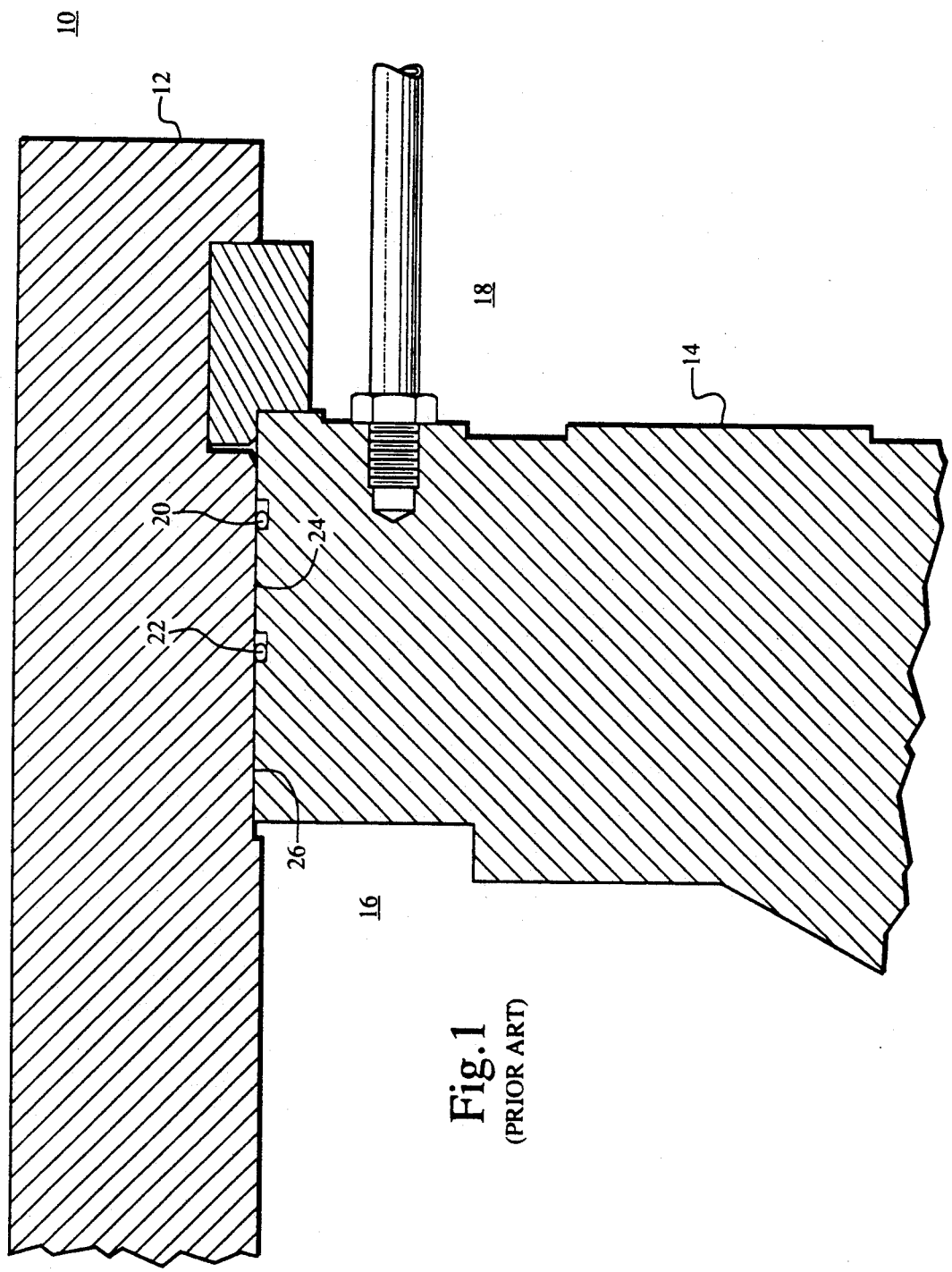
FIG. 1 is a schematic representation of a prior art high pressure unit such as a compressor having first and second surfaces joined together in a sealed relationship with first and second spaced O-ring seals.

FIG. 1 is a description of a prior art high pressure unit 10 such as a barrel compressor or split compressor. A double O-ring seal 20 and 22 forms a seal in the cavity between a circular head 14 and the cylindrical casing 12 of the compressor. The interior chamber 16 of the compressor contains the high pressure, whereas area 18 external to the compressor is ambient air pressure. The spaced O-rings 20 and 22 enclose a portion of the annular cavity 24 between them which is subject to pressurization by permeation of the high pressure in the interior 16 of the compressor through the space or cavity 26 between the cylindrical casing 12 and the circular head 14. The annular cavity 24 enclosed by the two O-rings is subject to pressurization by permeation of the high pressure in the chamber 16 through the inner O-ring 22. The inner high pressure chamber 16 of the device is subject to periodic depressurization. When it is depressurized as, for instance, when the compressor is shut down, the high pressure that is trapped in the cavity 24 by permeation during operation of the unit remains. That high pressure is applied to the O-rings 20 and 22 over prolonged periods when the compressor is off, causing undue wear and erosion or degradation of the O-rings 20 and 22, thus causing them to have to be replaced more often than need be.

Figure 2:
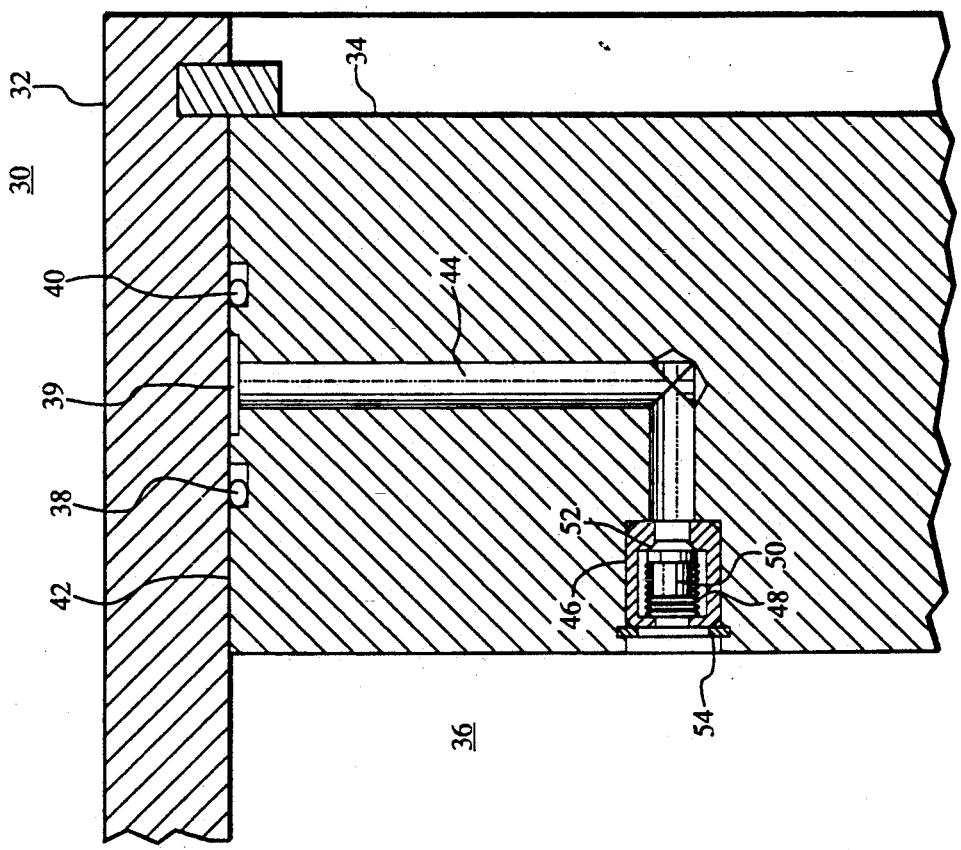
FIG. 2 is a partial schematic representation of a high pressure device such as a compressor utilizing the present invention which has a passageway including a check valve therein and illustrating the check valve in the closed position such as when the compressor is operating to prevent any internal pressure generated by the compressor to pass through the check valve.

FIG. 2 illustrates a device for alleviating this problem. Again, assume that the device is either a barrel compressor or a split compressor having the two surfaces 32 and 34 such as a circular head and cylindrical casing of a barrel compressor or the cylindrical casing and a circular cartridge of a split compressor joined together in any well-known manner to create a cavity 42 therebetween. To prevent leakage of the high pressure fluid from the interior chamber 36 to the exterior of the device, O-rings 38 and 40 are placed in spaced relationship between the surfaces 32 and 34. A conduit or passageway 44 serves as a vent having one end in fluid communication with the annular cavity 39 formed between the O-rings 38 and 40 and the other end in fluid communication with valve means 46. The valve means 46 has a sealing unit 50 forced by spring 48 to the closed position thus sealing the vent or passage 44 from the high pressure in the chamber 36 of the apparatus during periods of high pressure and allowing the conduit 44 to release or vent any pressure built up in the annular cavity 39 during periods of depressurization, of the chamber 36 of the apparatus. A snap ring 54 and corresponding groove arrangement hold the check valve 46 in a cylindrical bore that may be, for example, 0.75 inch in diameter. The vent or passageway 44 may be a 0.5 inch diameter cylindrical bore. Thus, as shown in FIG. 2, the compressor unit can be assumed to be in operation with the check valve 46 in the closed position.

Figure 3:
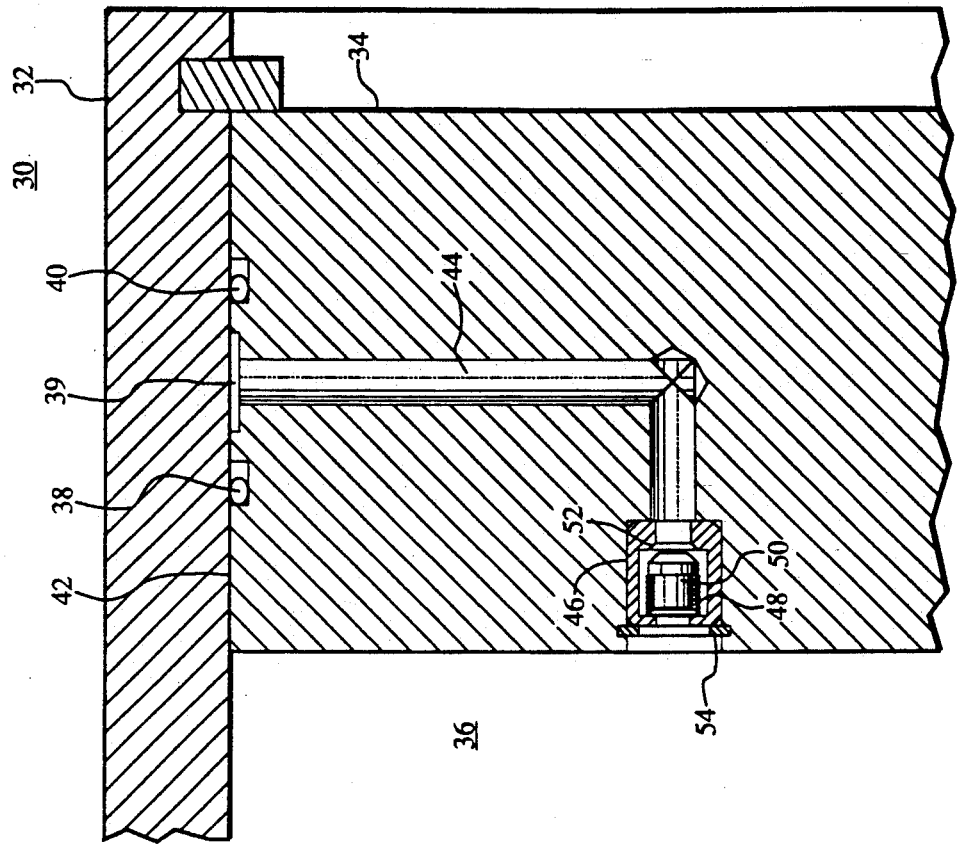
FIG. 3 is a partial schematic representation of a high pressure unit such as a compressor utilizing the present invention in which the check valve is shown in the open position during the time the compressor has been shut down, enabling any high pressure trapped in the cavity between the two O-ring seals to be automatically vented back into the interior of the compressor.

When the unit is depressurized as illustrated in FIG. 3, any residual pressure in the annular cavity 39 between the O-ring seals 38 and 40 is coupled through vent or passageway 44 to check valve 46. Because there is no pressure in the interior chamber 36 of the device, the pressure in passageway 44 opens the check valve 46 and vents itself back into the interior chamber 36 of the compressor unit. As can be seen in FIG. 3, the valve 46 is in the open position with fluid communication between vent or passageway 44 and the interior 36 of the compressor. Thus, any residual pressure between the two O-rings 38 and 40 in the annular passageway 39 is vented and reduces the wear and degradation on the O-rings 38 and 40 caused by constant pressure as is found in the prior art.

Thus, there has been disclosed a novel system for protecting the seals in a high pressure device such as a compressor by venting the annular cavity formed between a spaced pair of O-ring seals during the periods of time that the unit is depressurized or not operating. A one-way check valve is coupled between the annular cavity or space between the joined surfaces intermediate the O-ring seals to the interior of the high pressure chamber to prevent high pressure fluid from the chamber from entering the check valve during the existence of the high pressure in the chamber while allowing any high pressure fluid trapped between the seals to automatically vent to the interior of the hollow chamber only when the hollow chamber is depressurized, thus relieving the stress on the seals.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. An automatic double O-ring seal depressurization system comprising:
    said double O-ring seal including inner and outer O-rings forming a seal between walls forming an inner high pressure side and an outer low pressure side of an apparatus, said inner and outer O-rings being spaced axially from one another so as to form an annular cavity therebetween;
    said annular cavity being subject to pressurization by permeation of the high pressure through the inner O-ring;
    said inner high pressure side of said apparatus being subject to periodic depressurization;
    valve means for automatically venting all excess pressure in said annular cavity to said apparatus inner high pressure side during said periodic depressurization of said inner side of said apparatus;
    a vent means having one end in fluid communication with said annular cavity and the other end in fluid communication with the valve means wherein said vent means is contained within one of said walls; and
    said valve means sealing said vent means from the high pressure on the inner side of said apparatus during periods of high pressure and allowing said vent means to automatically vent any excess pressure built up in said annular cavity to said inner higher pressure side of said apparatus during periods of depressurization of said inner high pressure side of said apparatus, said valve means being opened only in response to excess pressure built up in said annular cavity such that the pressure within said annular cavity and said inner side is essentially equal.

2. The seal depressurization system of claim 1 wherein said apparatus is a barrel compressor and said double O-ring seal forms a seal between a circular head and a cylindrical casing of said compressor, and wherein said valve means is a check valve located on the inner high pressure side of said head.

3. The seal depressurization system of claim 1 wherein said apparatus is a split compressor and said double O-ring seal forms a seal between a cylindrical casing and a circular cartridge of said compressor, and wherein said valve means is a check valve located on said inner high pressure side of said cartridge.

4. The seal depressurization system of claim 2 wherein said vent means comprises a 0.5 inch diameter cylindrical bore in said head.

5. The seal depressurization system of claim 3 wherein said vent means comprises a 0.5 inch diameter cylindrical bore in said cartridge.

6. The seal depressurization system of claim 4 wherein said check valve is seated in a 0.75 inch diameter cylindrical bore in said head and is locked in position by a snap ring and groove arrangement.

7. The seal depressurization system of claim 5 wherein said check valve is seated in a 0.75 inch cylindrical bore in said cartridge and is locked in position by a snap ring and groove arrangement.

8. An improved double O-ring seal comprising:
inner and outer O-rings forming a seal between walls forming an inner high pressure side and an outer low pressure side of an apparatus, said inner and outer O-rings being spaced axially from one another so as to form an annular cavity therebetween;
said annular cavity being subject to pressurization by permeation of the high pressure through the inner O-ring;
said inner high pressure side of said apparatus being subject to periodic depressurization;
means for automatically venting all excess pressure in said annular cavity to said inner high pressure side of said apparatus during said periodic depressurization of said inner high pressure side of said apparatus wherein said means for automatically venting is activated only by the excess pressure in said annular cavity;
a vent means having one end in fluid communication with said annular cavity and the other end in fluid communication with a valve means wherein said vent means is contained within one of said walls; and
said valve means sealing said vent means from the high pressure on the inner side of said apparatus during periods of high pressure and allowing said vent means to vent any excess pressure built up in said annular cavity to said inner high pressure side of said apparatus during periods of depressurization of said inner side of said apparatus.

9. The double O-ring seal of claim 8 wherein said apparatus is a barrel compressor and said double O-ring seal forms a seal between a circular head and a cylindrical casing of said compressor, and wherein said valve means is a check valve located on the inner high pressure side of said head.

10. The double O-ring seal of claim 8, wherein said apparatus is a split compressor and said double O-ring seal forms a seal between a cylindrical casing and a circular cartridge of said compressor, and wherein said valve means is a check valve located on said inner high pressure side of said cartridge.

11. The double O-ring seal of claim 9 wherein said vent means comprises a 0.5 inch diameter cylindrical bore in said head.

12. The double O-ring seal of claim 10 wherein said vent means comprises a 0.5 inch diameter cylindrical bore in said cartridge.

13. The double O-ring seal of claim 11 wherein said check valve is seated in a 0.75 inch diameter cylindrical bore in said head and is locked in position by a snap ring and groove arrangement.

14. The double O-ring seal of claim 12 wherein said check valve is seated in a 0.75 inch cylindrical bore in said cartridge and is locked in position by a snap ring and groove arrangement.

15. In a centrifugal compressor having a double O-ring seal between a cylindrical casing and a circular end element, said double O-ring seal including inner and outer O-rings forming a seal between the high pressure interior and low pressure exterior of said compressor, said inner and outer O-rings being spaced axially from one another so as to form an annular cavity therebetween said annular cavity being subject to pressurization by permeation of the high pressure through said inner O-ring, said interior of said compressor being subject to periodic depressurization, the improvement comprising means for automatically depressurizing said annular cavity between said inner and outer O-rings only during depressurization of said interior of said compressor and only in response to the pressure within said cavity.

16. The compressor of claim 15 wherein said means for automatically depressurizing said annular cavity comprises:
a vent means having one end in fluid communication with said annular cavity and the other end in fluid communication with a valve means; and
said valve means sealing said vent means from the high pressure on the interior of said compressor during periods of high pressure and allowing said vent means to release any pressure built up in said annular cavity only during depressurization of said interior of said compressor.

17. The compressor of claim 16 wherein said compressor is a barrel compressor and said circular end element is a circular head.

18. The compressor of claim 17 wherein said valve means is a check valve located on the inner high pressure side of said head.

19. The compressor of claim 16 wherein said compressor is a split compressor and said circular end element is a circular cartridge.

20. The compressor of claim 19 wherein said valve means is a check valve located on said inner high pressure side of said cartridge.

21. The compressor of claim 18 wherein said vent means comprises a cylindrical bore in said head.

22. The compressor of claim 20 wherein said vent means comprises a cylindrical bore in said cartridge.

23. A system for automatically depressurizing the area between adjacent spaced pressure seals comprising:
a high pressure fluid chamber having at least two surfaces joined together to from the chamber;
first and second spaced seals in the space between the surfaces to form a barrier to prevent the high pressure from leaking from the chamber through the space between the joined surfaces; and
a one-way check valve coupling the space between the joined surfaces intermediate of the seals to the interior of the high pressure chamber to allow any high pressure fluid trapped between the seals to automatically vent tot he interior of the chamber only when the chamber is depressurized and wherein only the high pressure fluid trapped between the seals causes the check valve to vent the high pressure fluid while preventing high pressure fluid from the chamber from entering the check valve during the existence of the high pressure in the chamber, thus relieving the stress on the seals when the chamber is depressurized.

24. A system for automatically depressurizing high pressure seals as in claim 23 further comprising:
- a passageway coupling the space between the seals to the interior of the high pressure chamber; and
- the one-way check valve being placed in the passageway to vent the pressure between the seals only when the hollow chamber is depressurized.

25. A method of protecting spaced high pressure seals in a high pressure chamber from damage caused by retained high pressure between the seals after the high pressure in the chamber has been removed comprising the step of coupling a one-way check valve from the area between the seals to the interior of the high pressure chamber to automatically vent the area between the seals only when the high pressure in the chamber has been released and only in response to the high pressure between the seals.

26. A method as in claim 25 further comprising the steps of:
- coupling a passageway from the area between the seals to the interior of the high pressure chamber; and
- placing said check valve in the passageway to vent the area between the seals into the interior of the high pressure chamber only when the high pressure in the chamber has been released.

* * * * *

UNITED STATES PATENT AND TRADEMARK OFFICE
CERTIFICATE OF CORRECTION

PATENT NO. : 5,280,924
DATED : Jan. 25, 1994
INVENTOR(S) : Burgess

It is certified that error appears in the above-identified patent and that said Letters Patent is hereby corrected as shown below:

IN CLAIM 23 - Column 6, line 51, "from" should read --form--.

line 60, "tot he" should read --to the--.

Signed and Sealed this

Sixteenth Day of August, 1994

Attest:

BRUCE LEHMAN

Attesting Officer     Commissioner of Patents and Trademarks